United States Patent
Sun et al.

(10) Patent No.: US 11,473,978 B2
(45) Date of Patent: Oct. 18, 2022

(54) ENHANCED SUBSTRATE TEMPERATURE MEASUREMENT APPARATUS, SYSTEM AND METHOD

(71) Applicant: APPLIED Materials, Inc., Santa Clara, CA (US)

(72) Inventors: Dawei Sun, Nashua, NH (US); D. Jeffrey Lischer, Gloucester, MA (US); Qin Chen, Gloucester, MA (US); Dale K. Stone, Lynnfield, MA (US); Lyudmila Stone, Lynnfield, MA (US); Steven Anella, West Newbury, MA (US); Ron Serisky, Gloucester, MA (US); Chi-Yang Cheng, Gloucester, MA (US)

(73) Assignee: APPLIED Materials, Inc., Santa Clara, CA (US)

(*) Notice: Subject to any disclaimer, the term of this patent is extended or adjusted under 35 U.S.C. 154(b) by 396 days.

(21) Appl. No.: 16/560,566

(22) Filed: Sep. 4, 2019

(65) Prior Publication Data

US 2020/0378837 A1 Dec. 3, 2020

Related U.S. Application Data

(60) Provisional application No. 62/853,336, filed on May 28, 2019.

(51) Int. Cl.
| | |
|---|---|
| *G01K 1/16* | (2006.01) |
| *G01J 5/02* | (2022.01) |
| *G01J 5/10* | (2006.01) |
| *G01K 7/02* | (2021.01) |

(52) U.S. Cl.
CPC .............. *G01K 1/16* (2013.01); *G01J 5/0205* (2013.01); *G01J 5/10* (2013.01); *G01K 7/02* (2013.01)

(58) Field of Classification Search
USPC ........................................ 374/141, 208, 163
See application file for complete search history.

(56) References Cited

U.S. PATENT DOCUMENTS

| | | | | |
|---|---|---|---|---|
| 5,155,337 | A  * | 10/1992 | Sorrell | G05D 23/27 |
| | | | | 219/491 |
| 10,927,006 | B2 * | 2/2021 | Ventura | C01B 32/174 |
| 2004/0184981 | A1 | 9/2004 | Liu et al. | |
| 2007/0062439 | A1 * | 3/2007 | Wada | C30B 25/16 |
| | | | | 117/89 |
| 2007/0086503 | A1 | 4/2007 | Fujii | |
| 2007/0117213 | A1 | 5/2007 | Cole et al. | |

(Continued)

FOREIGN PATENT DOCUMENTS

| | | | |
|---|---|---|---|
| JP | 2009250757 A | * | 10/2009 |
| JP | 2012-122864 A | | 6/2012 |

OTHER PUBLICATIONS

JPS6389230U and Translation (Year: 1988).*

(Continued)

*Primary Examiner* — Mirellys Jagan
(74) *Attorney, Agent, or Firm* — KDB Firm PLLC

(57) ABSTRACT

A temperature measurement apparatus. The temperature measurement apparatus may include a temperature sensor body, the temperature sensor body having a substrate support surface; and a heat transfer layer, disposed on the substrate support surface, the heat transfer layer comprising an array of aligned carbon nanotubes.

15 Claims, 4 Drawing Sheets

(56) References Cited

U.S. PATENT DOCUMENTS

| | | | | |
|---|---|---|---|---|
| 2011/0051775 A1* | 3/2011 | Ivanov | ................... | G01K 7/18 |
| | | | | 977/956 |
| 2011/0189500 A1* | 8/2011 | Majumdar | ............ | H01L 23/373 |
| | | | | 156/60 |
| 2012/0162621 A1* | 6/2012 | Beerens | .............. | G03F 7/70716 |
| | | | | 355/72 |
| 2014/0015158 A1 | 1/2014 | Cola | | |

OTHER PUBLICATIONS

International Search Report and Written Opinion dated Aug. 7, 2020, for the International Patent Application No. PCT/US2020/031508, filed on May 5, 2020, 10 pages.

Taphouse et al., "Carbon nanotube thermal interfaces enhanced with sprayed on nanoscale polymer coatings", 2013_Nanotechnolgy_v24_Cola_Polymer-spray-coated-CNT-TIMs, Nanotechnology 24 (2013) 105401, Online at stacks.iop.org/Nano/24/105401, 9 pages.

Xu et al., "Enhancement of thermal interface materials with carbon nanotube arrays", International Journal of Heat and Miass Transfer 49 (2006) 1658-1666, 9 pages.

Yakobson et al., "Nanomechanics of Carbon Tubes: Instabilities beyond Linear Response", vol. 76, No. 14 Pysical Review Letters, Apr. 1, 1996, 4 pages.

Zhang et al., "Assessment of continuum mechanics models in predicting buckling strains of single-walled carbon nanotubes", Nanotechnology 20 (2009) 395707, doi:10.1088/0957-4484/20/39/395707, 9 pages.

\* cited by examiner

ENHANCED SUBSTRATE TEMPERATURE MEASUREMENT APPARATUS, SYSTEM AND METHOD

RELATED APPLICATIONS

This application claims priority from U.S. provisional patent application 62/853,336, filed May 28, 2019, entitled ENHANCED SUBSTRATE TEMPERATURE MEASUREMENT APPARATUS, and incorporated by reference in its entirety.

FIELD

This disclosure relates to substrate processing. More particularly, the present disclosure relates to improved temperature measurement during substrate processing.

BACKGROUND

Substrate processing for making electrical devices, electronic devices, optical devices, mechanical devices, and so forth, may entail operations such as layer deposition, substrate etching, ion implantation, annealing, or other processes, where measurement of substrate temperature is performed. In some instances, substrate temperature measurement is accomplished by placing a sensor in contact with the substrate. The sensor may be shaped as a flat portion, such as a disk or plate, placed in contact with the substrate, and may include an embedded thermocouple, where the thermocouple directly measures the temperature of the flat portion of the sensor. When processing substrates under vacuum or under partial vacuum, such as below 10 Torr total pressure, for example, the sensor may register a temperature differing from the actual temperature of the substrate, due to poor thermal contact between the substrate and sensor. While the thermal contact between sensor and substrate may be increased at higher pressures, such as at atmospheric pressure, many processes are designed to operate at low pressures.

With respect to these and other considerations the present disclosure is provided.

SUMMARY

In accordance with on embodiment, a temperature measurement apparatus is provided. The temperature measurement apparatus may include a temperature sensor body, the temperature sensor body having a substrate support surface, and a heat transfer layer, disposed on the substrate support surface, the heat transfer layer comprising an array of aligned carbon nanotubes.

In accordance with another embodiment, a processing system may include a processing chamber and a temperature measurement apparatus, disposed in the processing chamber. The temperature measurement apparatus may include a temperature sensor body, the temperature sensor body having a substrate support surface and may further include a heat transfer layer, disposed on the substrate support surface, the heat transfer layer comprising an array of aligned carbon nanotubes.

In a further embodiment, a method may include providing a temperature measurement apparatus in a processing chamber, where the temperature measurement apparatus includes a temperature sensor body and heat transfer layer, comprising an array of vertically aligned carbon nanotubes. The method may include arranging a substrate on the temperature measurement apparatus, wherein the array of vertically aligned carbon nanotubes is in direct contact with the substrate, and determining a substrate temperature by measuring a temperature of the temperature sensor body when the substrate is in contact with the heat transfer layer.

DETAILED DESCRIPTION

Figure 1:
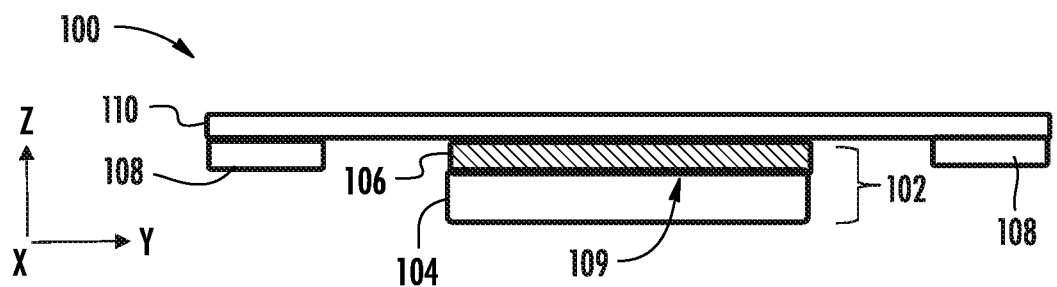
FIG. 1 depicts a temperature measurement apparatus, in accordance with embodiments of the disclosure.

The present embodiments will now be described more fully hereinafter with reference to the accompanying drawings, where various embodiments are shown. The subject of this disclosure, however, may be embodied in many different forms and should not be construed as limited to the embodiments set forth herein. Rather, these embodiments are provided so this disclosure will be thorough and complete, and will fully convey the scope of the subject of this disclosure to those skilled in the art. In the drawings, like numbers refer to like elements throughout.

Various embodiments involve apparatus and systems to measure temperature of a workpiece or substrate at low temperatures to elevated temperatures. The term "elevated temperature" as used herein, refers to substrate temperatures generally greater than about 50° C. Various embodiments are particularly useful for measuring substrates when disposed in an atmosphere below ambient pressure, such as below 100 Torr, below 1 Torr, or below 1 mTorr pressure. Under such ambient conditions, heat transfer via thermal conduction from a substrate to a temperature sensor placed in contact with the substrate may be minimal. Accordingly, the present embodiments provide enhanced thermal coupling between a temperature sensor and substrate via improved thermal and mechanical properties of a heat transfer layer.

In the following description and/or claims, the terms "on," "overlying," "disposed on" and "over" may be used in the following description and claims. "On," "overlying," "disposed on" and "over" may be used to indicate two or more elements are in direct physical contact with each other. However, "on,", "overlying," "disposed on," and over, may also mean two or more elements are not in direct contact with each other. For example, "over" may mean one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Figure 2:
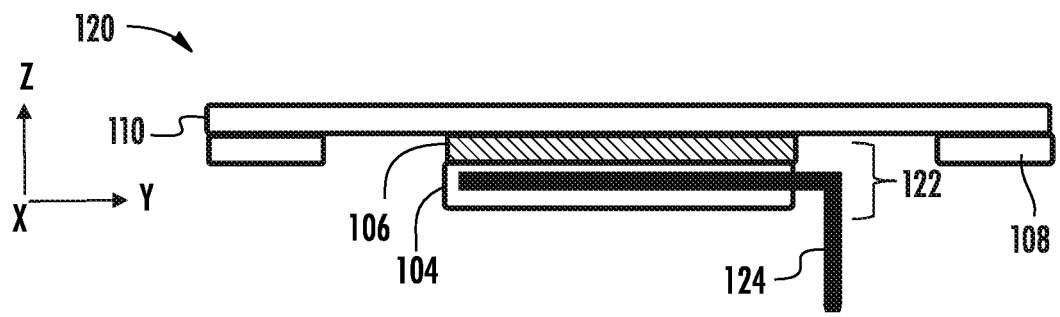
FIG. 2 depicts another temperature measurement apparatus, in accordance with embodiments of the disclosure.
Figure 3:
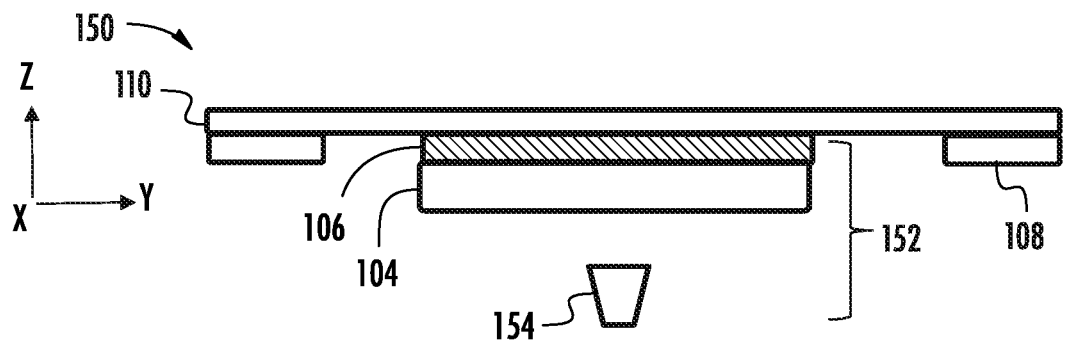
FIG. 3 depicts a further temperature measurement apparatus, in accordance with embodiments of the disclosure.

FIG. 1 to FIG. 3 depict different temperature measurement apparatus, in accordance with various embodiments of the disclosure. In FIG. 1, an apparatus 100 is shown, including a temperature measurement apparatus 102. The temperature measurement apparatus 102 may include a temperature sensor body 104, where the temperature sensor body may be configured generally as in known sensors, and may be constructed of a known material, such as a ceramic material or metallic material. The temperature sensor body 104 may be designed to abut against a substrate, such as substrate 110. Optionally, the apparatus 100 may include a substrate holder 108, to also support the substrate 110, where the temperature measurement apparatus 102 is included in the substrate holder 108, or is separate from the substrate holder 108. The substrate 110 may be a flat body, such as a wafer or plate, where the substrate defines a substrate plane coincident with or parallel to the X-Y plane of the Cartesian coordinate system shown. The temperature sensor body 104 may define a substrate support surface 109, disposed toward the substrate as shown.

The temperature measurement apparatus 102 may further include a thermal transfer layer, also referred to as a heat transfer layer 106, disposed on the substrate support surface 109. The heat transfer layer 106 includes an array of aligned carbon nanotubes (where the term "nanotube" may refer to carbon nanotube, unless otherwise noted), described in more detail below.

In a variant of the apparatus 100, the apparatus 120 of FIG. 2 may include similar components as apparatus 100, where like components are labeled the same. In addition, a temperature measurement apparatus 122 is provided, where the temperature sensor body 104 includes an embedded thermocouple 124, to directly measure the temperature of the temperature sensor body 104.

In a variant of the apparatus 100, the apparatus 150 of FIG. 3 may include similar components as apparatus 100, where like components are labeled the same. In addition, a temperature measurement apparatus 152 is provided. The temperature of the temperature sensor body 104 may be measured by a remote measurement component 154 of the temperature measurement apparatus 152. In some embodiments, the remote measurement component 154 may be an optical pyrometer, disposed in a line of sight view of the temperature sensor body 104, or other known remote temperature measurement component.

In each of the embodiments of FIGS. 1-3 the heat transfer layer 106 includes an array of aligned carbon nanotubes. Advantageously, the array of aligned carbon nanotubes may extend along an alignment direction, perpendicular to the substrate plane, meaning along the Z-axis shown. Arrays or "forests" of vertically aligned carbon nanotubes (VACNTs) have exceptional thermal and mechanical properties. In accordance with the present embodiments, these properties are harnessed for use in the heat transfer layer 106 to overcome thermal contact resistance under vacuum or low pressure, where microscopic voids are present between a substrate surface and a temperatures sensor body, such as temperature sensor body 104.

Figure 4:
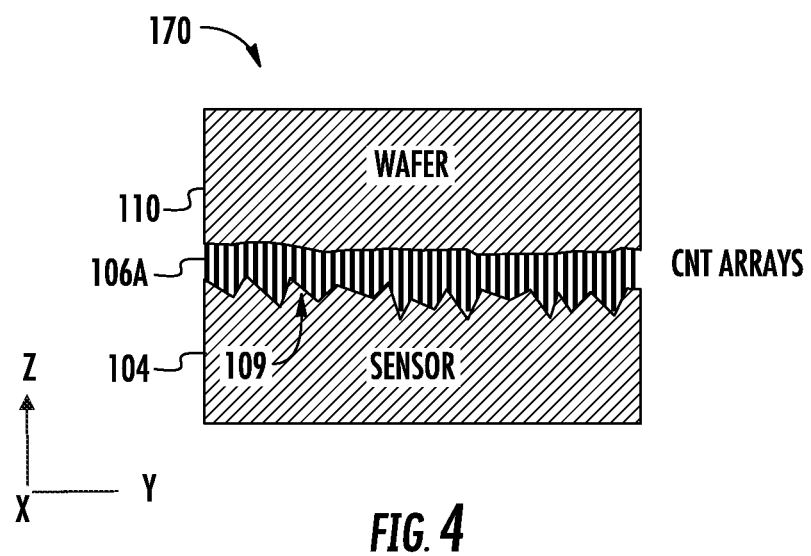
FIG. 4 depicts details of one embodiment of a heat transfer layer.
Figure 5:
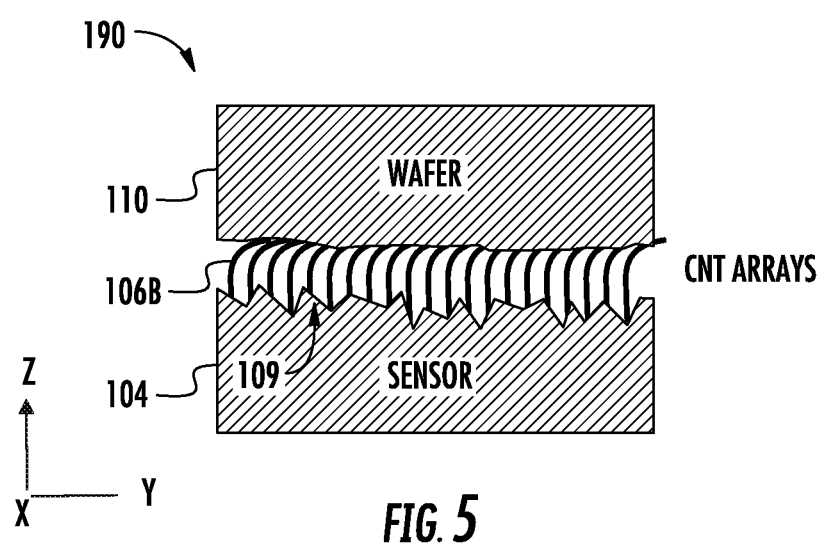
FIG. 5 depicts details of another embodiment of a heat transfer layer.

Turning to FIG. 4 depicts details of one embodiment of a thermal measurement apparatus 170, and FIG. 5 depicts details of another embodiment of a thermal measurement apparatus 190. In FIG. 4 heat transfer layer 106A is provided, including an array of vertically aligned nanotubes, aligned along the Z-axis. As such, in this embodiment, as well as other embodiments, the long axis of the vertically aligned nanotubes extends normal to nominal surface of the temperature sensor body 104 and the lower surface of the substrate 110, meaning the X-Y plane. In terms of thermal conductivities, calculations show single-wall nanotubes may have thermal conductivities in the range of 6,600 W/m-K and multiwall nanotubes may have thermal conductivities in the range of 300 W/m-K, along the tube axis, meaning along the Z-direction in the configurations of FIG. 4 and FIG. 5. Thus, the presence of the heat transfer layer 106A may enhance thermal conduction between the temperature sensor body 104 and substrate 110. According to various non-limiting embodiments, the heat transfer layer 106A may have a heat transfer coefficient, also referred to as thermal contact conductance, or thermal conductance, of 2,000 W/m$^2$-K to 250,000 W/m$^2$-K. This relatively high thermal conductance compares favorably to thermal conductance under vacuum between a silicon wafer and sensor of 200-600 W/m$^2$-K without a heat transfer layer 106A present.

In FIG. 5 heat transfer layer 106B is provided, including another array of vertically aligned nanotubes, aligned along the Z-axis. As such, the long axis of the nanotubes extends normal to nominal surface of the temperature sensor body 104 and the lower surface of the substrate 110, meaning the X-Y plane. A difference between the heat transfer layer 106A and heat transfer layer 106B is in the greater thickness of the heat transfer layer 106A.

In accordance with various non-limiting embodiments of the disclosure, the thickness of a heat transfer layer 106 may vary between one micrometer (μm) and several hundred micrometers. In some embodiments, the thickness of the heat transfer layer 106 (including heat transfer layer 106A or heat transfer layer 106B) may be approximately the same as the tube length of the nanotubes of the given heat transfer layer. Said differently, the thickness of the heat transfer layer in some embodiments may be one nanotube high along the Z-axis. Accordingly, nanotube thickness in various embodiments may range from approximately 1 μm to 500 μm.

As further suggested in FIG. 4 and FIG. 5, the respective heat transfer layers may conform with the substrate support surface 109, to occupy regions where voids would otherwise form between the temperature sensor body 104 and substrate 110. In some embodiments, the heat transfer layer 106A or heat transfer layer 106B, including arrays of aligned nanotubes, may be grown on the temperature sensor body 104, or may be alternatively placed on the temperature sensor body 104 after formation. Notably, the mechanical compliance of the nanotubes can further overcome the gaps due to surface roughness of the temperature sensor body 104 or substrate 110.

As a result of the high thermal conductivity provided the vertically aligned nanotubes, the temperature differences between the substrate 110 and temperature sensor body 104 may be minimized. Prior research has shown a thermal conductance for nanotubes having values of 50,000 W/m$^2$-K to 143,000-250,000 W/m$^2$-K. In accordance with some embodiments of the disclosure, the aforementioned apparatus may be deployed to provide a more accurate substrate temperature measurement when a substrate is heated above room temperature.

An analytical model was developed to predict the "measured" temperatures of the sensor under different conditions. Table I. shows the comparison of predicted sensor measurements at different wafer temperatures, based upon an analytical model using different thermal conductance values between substrate and sensor. The true wafer temperature is shown in the left column for two different temperatures. The middle column shows the sensor temperature for a sensor adjacent the wafer, without the use of a VACNT coating used as the heat transfer layer, as in the case in present day sensors.

Without the use of a VACNT coating, at 150° C. true wafer temperature, the difference between sensor temperature and wafer temperature is 6° C., while at 500° C. true wafer temperature, this difference increases to 36° C.

With the use of a VACNT coating, at 150° C. true wafer temperature, the difference between sensor temperature and wafer temperature is 0.1° C., and at 500° C. true wafer temperature, this difference is merely 0.4° C., demonstrating the great improvement afforded by use of a VACNT coating.

TABLE I

| True wafer temperature | 450 W/m²-K (current) | 50,000 W/m²-K (VACNTs) |
|---|---|---|
| 150° C. | 144° C. | 149.9° C. |
| 500° C. | 464° C. | 499.6° C. |

Thus, in the aforementioned apparatus of the present embodiments, a thermocouple measuring the temperature of the temperature sensor body 104 will accurately measure the temperature of a wafer disposed thereon, to within as little as 0.1° C.-0.5° C., over a wide range of substrate temperatures. Similarly, a remote measurement component for measuring the temperature of a temperature sensor body 104, will accurately measure the wafer temperature of a wafer disposed thereon, within the accuracy of the measurement technique for measuring the sensor body temperature, plus the 0.1° C.-0.5° C. difference.

Notably, in-plane temperature uniformity (within X-Y plane) may also be adjusted by changing the length of carbon nanotubes used in the heat transfer layer 106. As an example, relatively longer nanotubes while generally extending along a normal to a plane of the heat transfer layer (X-Y) plane, when unloaded without a substrate, may tend to bend more under weight of a substrate 110, where at least a portion of the bended nanotubes (see upper region near substrate 110) may bend at least partially away from the normal (Z-axis). This bending can help to spread the heat laterally in the X-Y plane, as suggested in FIG. 5.

Notably, carbon nanotubes, when under sufficient compressive force, tend to deform and then buckle. Plastic deformation may be of a concern for a temperature sensor subjected to repeated vertical mechanical impact from the wafer. To estimate various forces experienced by nanotubes, the deformation of the carbon nanotubes can be calculated based on thick shell theory. Under the following assumptions one can calculate the strain of each nanotube, which is $\sim 1.7 \times 10^{-4}$ 4 nm-diameter CNTs arranged in an array with the number density of nanotubes given as $10^8/cm^2$ 3 CNT pads uniformly support a 300 mm Si wafer $ND_{CNT} := 10^{10} \frac{1}{cm^2}$     CNT tube number density $N_{CNT} := A_{top} \cdot ND_{CNT} = 5.067 \times 10^8$     Total number of CNTs $L_{CNT} := 10 \ \mu m$     Length of CNT tube $D_{CNT} := 4 \ nm$     CNT diameter $h_{CNT} := 0.066 \ nm$     CNT shell thickness $A_{CNT} := \pi \cdot D_{CNT} h_{CNT}$     CNT shell diameter $P_{CNT} := \frac{F_0}{N_{CNT} \cdot A_{CNT}} = 0.952 \ GPa$     Pressure exerted on the tube $E_{CNT} := 5500 \ GPa$     Young's modulus of CNT $\varepsilon_{CNT} := \frac{P_{CNT}}{E_{CNT}} = 1.731 \times 10^{-4}$     Strain $\varepsilon_{cr} := \frac{1}{2} \left( \frac{\pi \cdot D_{CNT}}{L_{CNT}} \right)^2 = 7.896 \times 10^{-7}$     Critical buckling strain for long tubes According to known calculations, a slender carbon nanotube with a large aspect ratio (L/D) will behave as an Euler beam under axial compression. The critical buckling strain can be calculated as:

$$\varepsilon_{cr} = \pi^2 \frac{(D^2 + h^2)}{2L^2} = 8 \times 10^{-7}$$

Since, in the above example, $\varepsilon_{CNT} > \varepsilon_{cr}$, the nanotubes arranged with such a number density and length will buckle under the weight of a silicon wafer. However, this behavior is a nonlinear elastic behavior so the nanotubes may recover from buckling after the Si wafer load is removed.

Moreover, the critical buckling strain may be increased by increasing the density of nanotubes in an array and reducing the length, in a manner to exceed the actual strain.

Figure 6:
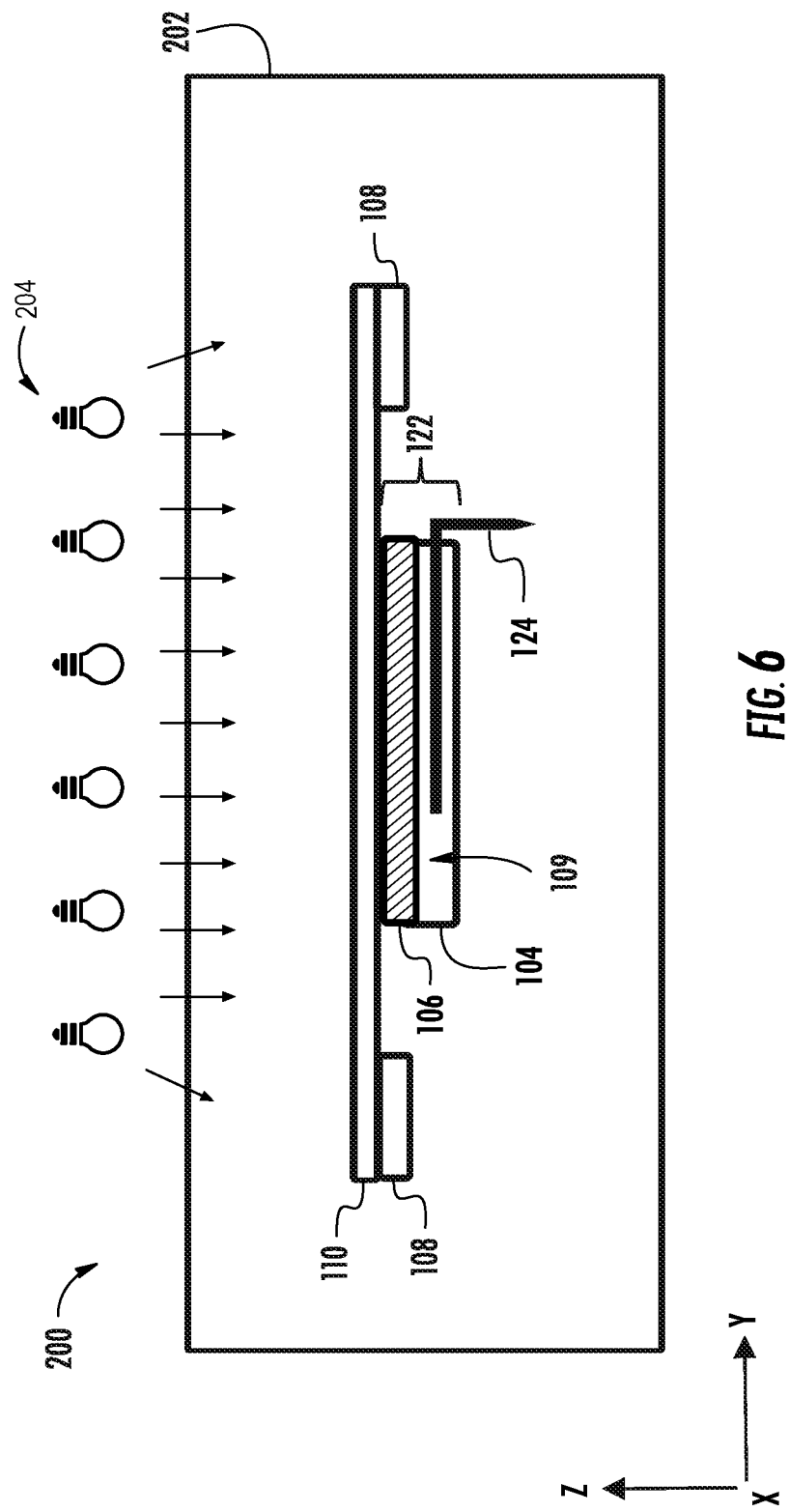
FIG. 6 depicts a processing apparatus, according to embodiments of the disclosure.

FIG. 6 depicts a processing system 200, according to embodiments of the disclosure. The processing system 200 may include a process chamber 202, and may include a temperature measurement apparatus, such as any of the embodiments of FIGS. 1-3. In the illustration of FIG. 6, an apparatus similar to the temperature measurement apparatus 122 is shown. The apparatus 120 may represent a preheat chamber, a cooling chamber, a process apparatus for performing any suitable operation, such as layer deposition, substrate etching, ion implantation, and so forth. As such, the substrate 110 may be subject to heating or cooling, either by virtue of a processing operation, or by external heating or cooling, where accurate substrate temperature measurement is useful. The processing system 200 may include, for example, a heating assembly 204, such as a lamp array, to heat the substrate 110, where accurate substrate temperature measurement is facilitated by the temperature measurement apparatus 122.

Figure 7:
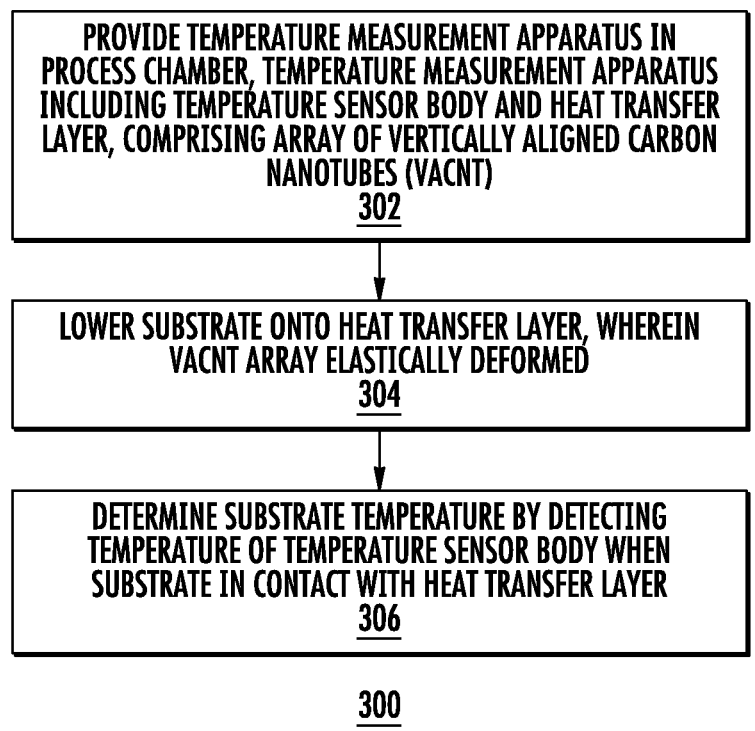
FIG. 7 depicts an exemplary process flow.

FIG. 7 depicts an exemplary process flow 300, in accordance with embodiments of the disclosure. At block 302, a temperature measurement apparatus is provided in a process chamber. The temperature measurement apparatus may include a temperature sensor body and heat transfer layer, comprising array of vertically aligned carbon nanotubes (VACNT).

At block 304, the substrate is lowered or placed onto the temperature measurement apparatus, and in particular, directly onto the heat transfer layer, in a manner where the VACNT array is elastically deformed. The VACNT array may be arranged at a given length of carbon nanotubes wherein the critical buckling strain is less than the strain induced by placement of the substrate on the VACNT array. As such, enhanced lateral thermal conductivity may be provided.

At block 306 substrate temperature is determined by detecting the temperature of the temperature sensor body when the substrate is in contact with the heat transfer layer.

In sum, the present embodiments provide enhanced temperature sensor apparatus, especially useful for temperature measurement of a substrate under vacuum or low pressure conditions, where thermal conduction via gas phase transport is minimal.

The present embodiments provide various advantages over known substrate temperature measurement approaches. A first advantage is the ability to provide more consistent and accurate temperature measurement of a substrate in a vacuum environment. Another advantage provided be the present embodiments is the intrinsic enhanced lateral temperature uniformity provided by bent CNT structures of a heat transfer layer, when a substrate is placed on a temperature sensor body.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize the usefulness is not limited thereto and will recognize the present disclosure may be beneficially implemented in any number of environments for any number of purposes.

What is claimed is:

1. A temperature measurement apparatus, comprising:
   a temperature sensor body, the temperature sensor body having a substrate support surface; and
   a heat transfer layer, the heat transfer layer being disposed on the substrate support surface, the heat transfer layer comprising a continuous array of aligned carbon nanotubes along the substrate support surface, wherein the continuous array of aligned carbon nanotubes is attached to the temperature sensor body on a first end and is free standing on a second end, and wherein the second end of the continuous array of aligned carbon nanotubes is configured to engage a substrate and support an entire weight of the substrate.

2. The temperature measurement apparatus of claim 1, wherein the continuous array of aligned carbon nanotubes comprise a tube length of 5 μm to 500 μm.

3. The temperature measurement apparatus of claim 1, further comprising a thermocouple, the thermocouple being embedded in the temperature sensor body.

4. The temperature measurement apparatus of claim 1, further comprising an optical pyrometer, the optical pyrometer being disposed in a line of sight view of the temperature sensor body.

5. The temperature measurement apparatus of claim 1, wherein the temperature sensor body comprises a ceramic material or a metallic material.

6. The temperature measurement apparatus of claim 1, wherein the substrate support surface extends parallel to a substrate plane, and wherein the continuous array of aligned carbon nanotubes extend along an alignment direction, the alignment direction being perpendicular to the substrate plane.

7. The temperature measurement apparatus of claim 6, the heat transfer layer comprising a thermal conductance of 2,000 W/m$^2$-K to 250,000 W/m$^2$-K, wherein the continuous array of aligned carbon nanotubes are configured to bend away from the alignment direction.

8. A processing system, comprising:
   a processing chamber;
   a temperature measurement apparatus, disposed in the processing chamber and comprising:
      a temperature sensor body, the temperature sensor body having a substrate support surface; and
      a heat transfer layer, the heat transfer layer being disposed on the substrate support surface, the heat transfer layer comprising a continuous array of aligned carbon nanotubes along the substrate support surface, wherein the continuous array of aligned carbon nanotubes is attached to the temperature sensor body on a first end and is free standing on a second end, and wherein the second end of the continuous array of aligned carbon nanotubes is configured to engage a substrate and support an entire weight of the substrate.

9. The processing system of claim 8, wherein the substrate support surface extends parallel to a substrate plane, and wherein the continuous array of aligned carbon nanotubes extend along an alignment direction, the alignment direction being perpendicular to the substrate plane.

10. The processing system of claim 8, wherein the array of aligned carbon nanotubes comprise a tube length of 5 μm to 500 μm.

11. The processing system of claim 8, further comprising a thermocouple, the thermocouple being embedded in the temperature sensor body.

12. The processing system of claim 8, further comprising an optical pyrometer, the optical pyrometer being disposed in a line of sight view of the temperature sensor body.

13. The processing system of claim 8, wherein the temperature sensor body comprises a ceramic material or a metallic material.

14. The processing system of claim 8, the heat transfer layer comprising a thermal conductance of 2,000 W/m$^2$-K to 250,000 W/m$^2$-K, wherein the continuous array of aligned carbon nanotubes are configured to bend away from the alignment direction.

15. The processing system of claim 8, further comprising a lamp array, the lamp array being arranged to heat the substrate when the substrate is disposed on the heat transfer layer.

* * * * *